United States Patent
Vindez et al.

[15] 3,663,115
[45] May 16, 1972

[54] PORTABLE DRILL WITH POWER DRAWBAR CLAMPING DEVICE

[72] Inventors: Pierre G. Vindez, Redondo Beach; Luis A. Bohorquez, Inglewood, both of Calif.

[73] Assignee: Zephyr Manufacturing Co., Inc., Manufacturing Division, Inglewood, Calif.

[22] Filed: Apr. 20, 1970

[21] Appl. No.: 30,027

[52] U.S. Cl. ...........................408/79, 408/95, 269/48.1, 74/110
[51] Int. Cl. ...........................B23b 45/14, B23q 3/14
[58] Field of Search ...........408/79, 87, 95; 269/48, 48.1; 74/110

[56] References Cited

UNITED STATES PATENTS

| 2,467,020 | 4/1949 | Fischer | 74/110 |
| 2,963,927 | 12/1960 | Hanger | 408/79 |
| 3,599,958 | 8/1971 | Schindler | 269/48.1 |

*Primary Examiner*—Francis S. Husar
*Attorney*—Whann & McManigal

[57] ABSTRACT

A pneumatically operated work sheet clamp attached to a portable power drill and utilizing a cam moved by a piston to operate the pilot of a collet assembly through an intermediate bell crank lever and drawbar means.

8 Claims, 7 Drawing Figures

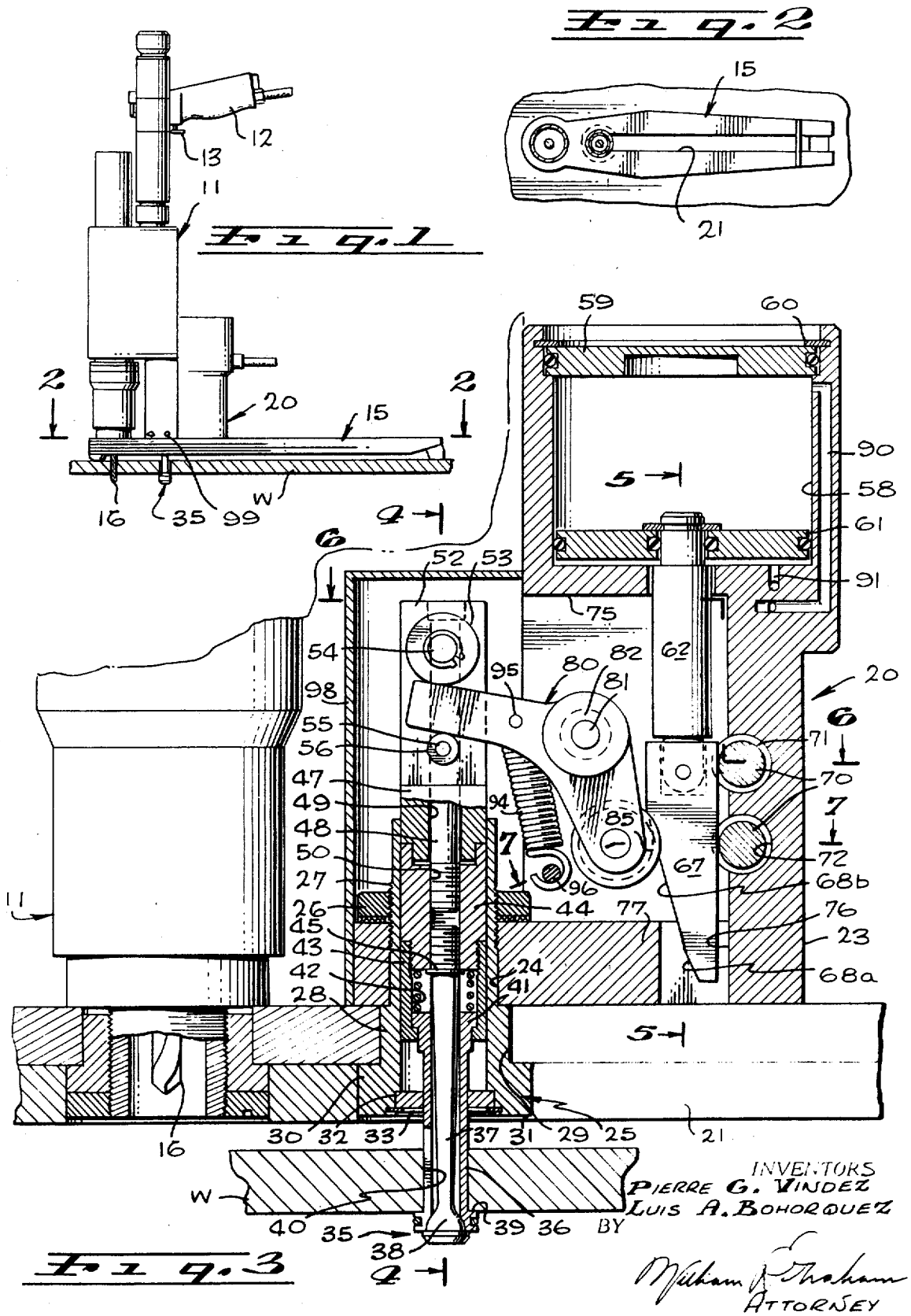

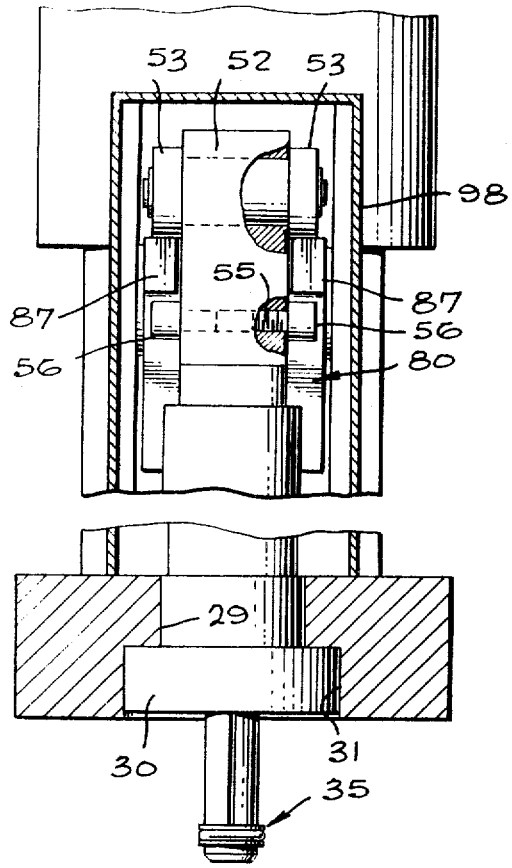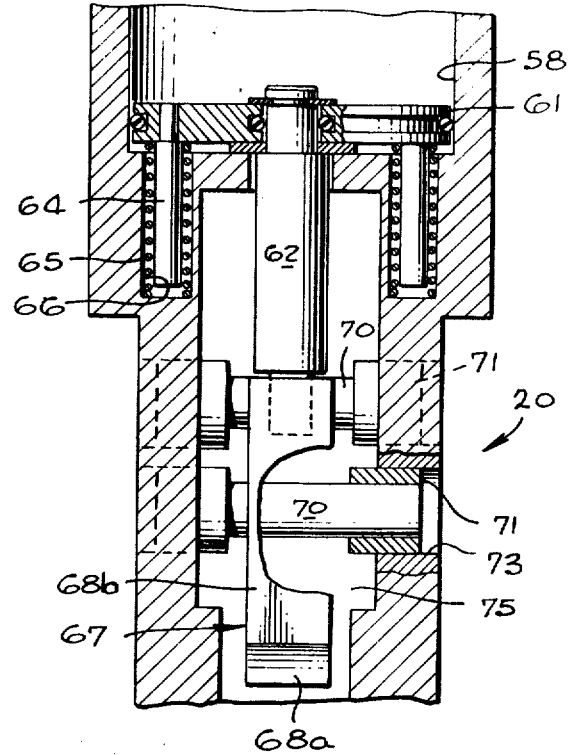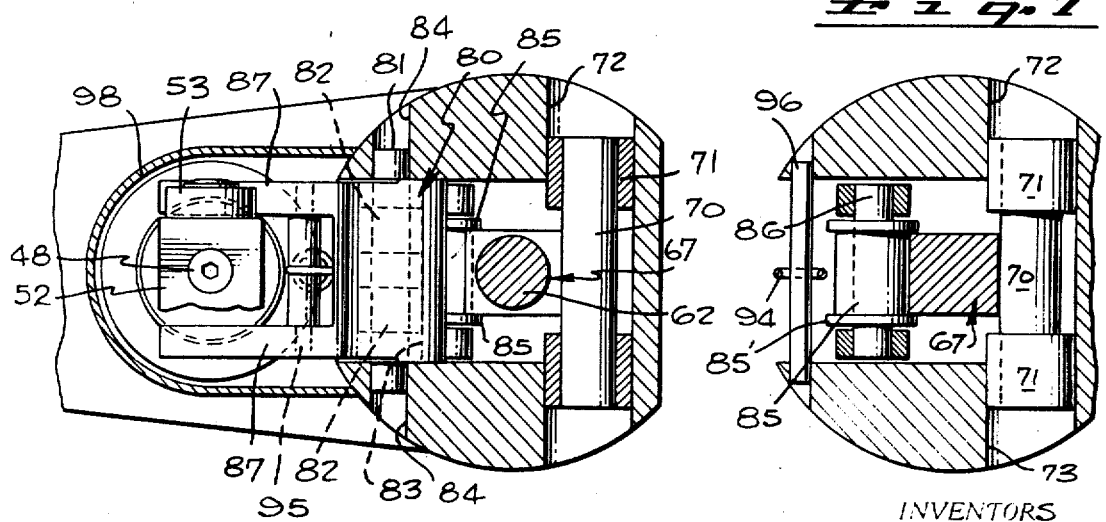

> # 3,663,115

PORTABLE DRILL WITH POWER DRAWBAR CLAMPING DEVICE

This invention relates to power-operated clamping attachments for portable power drills.

An object of the invention is to provide a novel and improved pneumatically operated work-clamping attachment for a portable power drill. More particularly it is an object to provide a device embodying a collet assembly for reception in a hole in a work sheet or the like to be drilled and novel means for operating the collet assembly to cause it to engage the far side of the work sheet.

A further object is to provide novel means for operating a collet assembly or other work gripping member in a manner such that when the same is moved to a clamping or work-engaging and holding position it is firmly locked in such a position.

Another object is to provide a novel power unit embodying a piston and cylinder and a cam and lever system associated therewith for operating devices and assemblies having a member mounted for limited linear movement.

In summary, it is an object to provide a clamping means for a portable power drill including a longitudinally movable work sheet clamping assembly extending generally parallel to the drilling axis of the drill and novel means for actuating the clamping assembly including a piston-cylinder unit-operated cam and lever means interposed between the cam and the clamping assembly.

These and other objects will be apparent from the drawings and the following description. Referring to the drawings:

FIG. 1 is a side elevational view of a power drill with a clamping device attached thereto embodying the invention;

FIG. 2 is a sectional plan view on line 2—2 of FIG. 1;

FIG. 3 is a central sectional elevational view through the clamping device of the invention, but on a larger scale;

FIG. 4 is a sectional view on lines 4—4 of FIG. 3;

FIG. 5 is a sectional view on lines 5—5 of FIG. 3;

FIG. 6 is a sectional view on lines 6—6 of FIG. 3; and

FIG. 7 is a sectional view on line 7—7 of FIG. 3.

More particularly describing the invention, numeral 11 generally designates a portable power drill having a pistol grip 12 with trigger control 13. The type shown is usually operated on compressed air. Attached to the front end of the drill is a foot or base plate 15 that extends laterally of the axis of the drill 16. The clamping device 20 of the invention mounts on the base plate which is slotted longitudinally at 21 to permit of the clamping device being adjustably positioned therealong at a desired distance with respect to the drilling axis.

The device 20 comprises a body 23 providing a bore 24 which receives a generally cylindrical pilot housing 25 that is held in place by a nut 26 that threads onto the upper end portion 27. The lower end of the pilot housing is radially enlarged at 28 to be received in the upper portion 29 of slot 21 in the base while the lower end is further radially enlarged at 30 to be received in a lower wider portion 31 of slot 21. The lower end of the housing 25 is provided with an apertured guide plate 32 held by a retainer ring 33. Mounted partially within the pilot housing and movable relative thereto for limited movement is a collet assembly designated generally by numeral 35.

The collet assembly includes the usual axially split collet or sleeve 36 on a pilot 37 having a head 38 adapted to expand the collet so that a shoulder 39 thereon will engage the far side of the work when the collet and pilot are introduced through a hole 40 in the work W and the pilot pulled or retracted to the position shown. The collet has an enlarged inner end portion 41 which is received in a bore 42 in a liner holder 43. The latter threads onto a pilot head 44. The pilot is fitted with a retainer ring 45 and is threaded into the pilot head. The latter is connected to a clamping head 47 by a cap screw 48 in bore 49 in the clamping head which threads into a threaded bore 50 in the pilot head.

The upper portion 52 of the clamping head is rectangular in cross section and provided with a roller 53 at each side on a shaft 54 near its outer or upper end. It is also provided with a return pin 55 and spacer 56 at each side, these being spaced inwardly from the rollers 53. The clamping head 47 and parts connecting it to pilot 37 form what may be termed a pilot drawbar means.

In order to operate the collet assembly we provide a piston cylinder unit and cam and lever means. This includes the cylinder 58 formed in the body 23 and having a head 59 held by retainer ring 60. Within the cylinder is a piston 61 provided with a piston rod 62 extending parallel to the collet assembly. The piston has guide pins 64 which are received in piston return springs 65 in bores 66. The piston rod is provided at its outer end with an elongated cam 67 having the cam surface 68a, 68b. The cam is supported on the side farthest from the collet assembly by two laterally spaced shafts 70 mounted in bearings 71 in bores 72 and 73. The shafts are partially within an open-sided cavity 75 in the body which receives the piston rod and cam. An aperture 76 in the lower wall 77 of the body also receives the end of the cam.

Between the cam and the clamping head we provide a bifurcated bell crank lever 80 which is pivotally mounted on a shaft 81 by means of bearings 82 in bore 83. The shaft is mounted in aligned bores 84. The lever carries a cam follower roller 85 at one end on a shaft 86. Preferably the roller has two radially enlarged flanges 85' between which the cam is received. At its other end the two sections 87 of the lever straddle the clamping head, being received between the rollers 53 and return spacers 56.

With the construction outlined, when the piston is operated by admittance of pressure fluid thereto to move the parts to the position shown in the drawing, the cam on the end of the piston rod serves to rotate the bell crank lever 80 and this in turn raises or pulls the clamping head and consequently the pilot head and pilot connected thereto resulting in the expansion of the collet. It will be apparent that with the parts in the position shown the pilot is locked in position since any force tending to pull against the pilot and release the collet would be ineffective to rotate the lever against the cam.

It is to be understood that cylinder 58 is provided with a pressure fluid, preferably compressed air, through suitable passages such as those partially shown at 90 and 91 in FIG. 3, and the medium of a conventional fluid supply and control system (not shown). A relatively strong return spring 94 is provided for lever 80, being connected between a pin 95 on the lever and a pin 96 mounted in the body. A housing or cover 98, held by screws 99, is shown around the upper part of the collet assembly and closing the cavity 75.

It will be apparent that the basic power mechanism is useful for operating other clamping devices as well as other elements wherein a member must be pulled longitudinally a limited distance and held locked in place with a minimum amount of fluid pressure.

I claim:

1. In combination, a portable power drill having a drilling axis and a pneumatically operated work clamping device, comprising a base mounted on the drill and extending laterally of the drilling axis thereof, a piston-cylinder unit mounted on said base and including a stationary element and a movable element, a cam carried by the movable element, a work clamping assembly extending parallel to the drilling axis of the drill and including an axially movable pilot drawbar means, and a lever pivotally mounted between and operably engageable with said cam and said drawbar means for pulling said drawbar means in response to given directional movement of said cam.

2. The device set forth in claim 1 in which spring means is provided yieldably resisting pivotal movement of the lever in a direction to pull the drawbar means.

3. In combination, a portable power drill having a drilling axis and a pneumatically operated work clamping device for a portable drill, comprising a base mounted on the drill and extending laterally of the drilling axis thereof, a piston-cylinder unit mounted on the base and including a stationary cylinder and movable piston with a piston rod, a cam on said rod, a work clamping assembly extending generally parallel to the drilling axis and including an axially movable pilot drawbar means, a lever pivotally mounted between said cam and drawbar means, said lever being operably connected to the drawbar means at one end and operably engageable with the cam at the other end, and spring return means yieldably resisting movement of said lever and drawbar means by said cam.

4. The device set forth in claim 3 in which the axis of said piston rod is parallel to and laterally offset from the axis of said drawbar means, and in which said lever is a bell crank.

5. The device set forth in claim 4 in which said lever has a cam follower roller at one end and is bifurcated at the other end to receive the drawbar means at the other end, and in which said drawbar means is provided with a roller at each side for engagement by said other end of said lever.

6. A power device for pulling a drawbar or the like a limited distance and subsequently holding the same against return movement, comprising:
   a. a body providing a cylindrical chamber;
   b. a piston in the chamber having a piston rod;
   c. a cam carried by said piston rod;
   d. an axially movable drawbar means mounted in said body laterally of said cam;
   e. a bell crank-like lever pivotally mounted in said body laterally of said cam and operably engageable with said cam and said drawbar means for pulling said drawbar means in response to given directional movement of said cam; and
   f. spring means connected to said bell crank-like lever for yieldably resisting pivotal movement of said bell crank-like lever in a direction to pull said drawbar means.

7. A power device as defined in claim 6 in which said bell crank-like lever is bifurcated at one end to receive said drawbar means and in which said drawbar means is provided with a roller at each side for operable engagement by the bifurcated end of said bell crank-like lever.

8. A power device as defined in claim 7 in which the axis of said drawbar means is parallel to and laterally offset from the axis of said piston rod and in which the pivot point of said bell crank-like lever is disposed between said drawbar means and said cam.

* * * * *